(12) United States Patent
Romig

(10) Patent No.: US 7,568,757 B2
(45) Date of Patent: *Aug. 4, 2009

(54) SUNROOF DRAIN TUBE MOUNTING ARRANGEMENT

(75) Inventor: Joel Romig, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/935,248

(22) Filed: Nov. 5, 2007

(65) Prior Publication Data

US 2008/0061603 A1  Mar. 13, 2008

Related U.S. Application Data

(63) Continuation of application No. 10/989,575, filed on Nov. 16, 2004, now Pat. No. 7,404,597.

(60) Provisional application No. 60/583,677, filed on Jun. 29, 2004.

(51) Int. Cl.
  *B62D 25/007* (2006.01)
  *B60R 21/213* (2006.01)
(52) U.S. Cl. .................... 296/213; 296/208; 280/728.2; 280/730.2
(58) Field of Classification Search ............. 280/730.2, 280/728.2; 296/208, 213
  See application file for complete search history.

(56) References Cited

U.S. PATENT DOCUMENTS

| | | | |
|---|---|---|---|
| 4,355,843 A | 10/1982 | Murakami | |
| 4,589,694 A | 5/1986 | Kempter | |
| 5,902,008 A | 5/1999 | Butsuen et al. | |
| 6,155,596 A | 12/2000 | Nakajima et al. | |
| 6,189,961 B1 | 2/2001 | Poliskie et al. | |
| 6,224,091 B1 | 5/2001 | Eyrainer et al. | |
| 6,267,407 B1 | 7/2001 | Zychowicz et al. | |
| 6,409,591 B1 * | 6/2002 | Sullivan et al. | 454/164 |
| 6,565,117 B2 | 5/2003 | Kubota et al. | |
| 6,601,902 B1 | 8/2003 | Rahmstorf et al. | |
| 6,663,141 B2 | 12/2003 | Thomas et al. | |
| 6,786,537 B2 * | 9/2004 | Allan et al. | 296/213 |
| 2001/0000290 A1 | 4/2001 | Nakajima et al. | |
| 2002/0125693 A1 | 9/2002 | Alsup et al. | |
| 2003/0030257 A1 | 2/2003 | Thomas et al. | |
| 2004/0000775 A1 | 1/2004 | Henderson et al. | |
| 2005/0062267 A1 | 3/2005 | Recker et al. | |

* cited by examiner

*Primary Examiner*—John Q. Nguyen
*Assistant Examiner*—Timothy Wilhelm
(74) *Attorney, Agent, or Firm*—Mark A. Duell; Fay Sharpe LLP

(57) ABSTRACT

A vehicle mounting arrangement is provided for a vehicle having a sunroof with a sunroof drain tube and an inflatable airbag. The drain tube and the inflatable airbag are mounted to a vehicle roof rail of the vehicle. The vehicle mounting arrangement includes an inflatable airbag mounted to the vehicle roof rail. The inflatable airbag is expandable toward an interior side of the vehicle. A sunroof drain tube is pivotally mounted to the vehicle roof rail and positioned adjacent the inflatable airbag so that the drain tube is pivotally displaced upon expansion of the inflatable airbag.

19 Claims, 3 Drawing Sheets

SUNROOF DRAIN TUBE MOUNTING ARRANGEMENT

This application is a continuation of U.S. patent application Ser. No. 10/989,575, filed on Nov. 16, 2004, and claims priority of U.S. Provisional Application Ser. No. 60/583,677, filed Jun. 29, 2004, both expressly incorporated herein by reference.

BACKGROUND

The present disclosure relates to a drain tube mounting arrangement in a vehicle and, more particularly, to the mounting of a sunroof drain tube and positioning thereof relative to an adjacent side curtain airbag. In one embodiment, a sunroof drain tube is pivotally mounted in a vehicle adjacent a side curtain airbag and will be described with particular reference thereto. It is to be appreciated, however, that the present disclosure may relate to other similar environments and applications.

Inflatable safety restraints such as airbags are often utilized in motor vehicles for their potential to reduce injuries and possibly fatalities to vehicle occupants that result from the vehicle being struck, colliding with another vehicle or object, or overturning. More recently, airbags have been employed as curtains within a vehicle and are often positioned along sides of the passenger compartment of the vehicle to further improve the safety of vehicle occupants, particularly against side impacts and roll-overs.

One type of airbag utilized along a side of a vehicle is a side curtain airbag. Conventional curtain airbags unfold or unroll downward to inflate beside an adjacent vehicle occupant to create a barrier between the occupant and the portion of the vehicle defining a passenger compartment in which the occupant is carried. Often, curtain airbags are sized to hold relatively large volumes of inflation gas and are able to extend from a roof rail of a vehicle to at least below a window sill of the vehicle. As a result, these types of curtain airbags can include a relatively large amount of airbag material. Generally, this material is rolled or folded tightly into an elongated tubular bundle. When the curtain airbag is deployed or inflated, the curtain unrolls or unfolds along a side of the passenger compartment of the vehicle, typically adjacent side windows and doors of the vehicle, thereby creating an inflatable barrier for the vehicle occupants.

Typically, side curtain airbags are mounted along a vehicle's side roof rail. When the curtain is inflated, it breaks through a cover, if a cover is utilized, as inflation gas fills the curtain. In many conventional mounting arrangements, the side curtain airbag is mounted to the vehicle's roof rail by a plurality of mounts, which can be bolts or other types of permanent fastening devices. Generally, the roof rails of a vehicle are relatively small and narrow for purposes of providing an appealing and spacious vehicle interior for the vehicle occupants. Thus, the area in which the inflatable curtain is installed and stored (when not being deployed) is relatively small and narrow.

Often, besides the inflatable curtain, a variety of other components are installed in and/or around the roof rail. These components compete for space in this narrow area along the roof rail. Examples of such components include: hand grips, lighting fixtures, sun or moon roof brackets, sunroof drain tubes, wiring, heating and ventilation controls and/or ducts. All of these components require some mounting space. The available mounting space is further constrained by the structure of the vehicle and by the common desire to make the passenger compartment spacious and comfortable.

In addition to spatial constraints, another design issue relates to mounting arrangements of components that are positioned closely adjacent inflatable curtains. Specifically, components mounted closely adjacent inflatable curtains are desirably prevented from projecting into the passenger compartment upon deployment of the side curtain airbag. One such component is the sunroof drain tube which, when utilized in a vehicle, often extends along a portion of a roof rail to which the side curtain airbag is mounted.

The drain tube is typically routed over the side curtain airbag which reduces the likelihood of the drain tube projecting into the passenger compartment upon inflation of the side curtain airbag. However, in some vehicle designs, routing the drain tube over the side curtain airbag is not feasible. Accordingly, any improvements to the mounting of components, such as a sunroof drain tube, adjacent the side curtain airbag are desirable, particularly those that decrease the likelihood of such components being projected into the passenger compartment during airbag deployment.

BRIEF SUMMARY

In accordance with one aspect, a vehicle mounting arrangement is provided for a vehicle having a sunroof with a sunroof drain tube and an inflatable airbag. The drain tube and the inflatable airbag are mounted to a vehicle roof rail of the vehicle. More particularly, in accordance with this aspect, the vehicle mounting arrangement includes an inflatable airbag mounted to the vehicle roof rail. The inflatable airbag is expandable toward an interior side of the vehicle. A sunroof drain tube is pivotally mounted to the vehicle roof rail and positioned adjacent the inflatable airbag so that the drain tube is pivotally displaced upon expansion of the inflatable airbag.

In accordance with another aspect, a drain tube mounting arrangement in a vehicle is provided. More particularly, in accordance with this aspect, an inflatable member is mounted to a vehicle roof rail and is expandable away from the vehicle roof rail along a passenger compartment of the vehicle. A conduit is pivotally mounted to the vehicle roof rail along the inflatable member so that upon deployment of the inflatable member the conduit is pivotally moved toward a roof of the vehicle.

In accordance with yet another aspect, a vehicle having a frame is provided. The vehicle includes a roof rail for supporting a roof over a passenger cabin and a side airbag mounted to the roof rail for selectively creating an inflatable barrier extending from the roof rail along the passenger cabin. More particularly, in accordance with this aspect, the vehicle includes an elongated conduit extending along a length of the roof rail. A sling hingedly connects the conduit to the roof rail along an interior side of the side airbag.

In accordance with still yet another aspect, a sunroof drain tube mounting arrangement is provided. More particularly, in accordance with this aspect, the mounting arrangement includes a curtain airbag mounted along one side of a vehicle roof. A sunroof drain tube is pivotally mounted along the one side of the vehicle roof adjacent an interior side of the curtain airbag so that the drain tube is pivotally directed toward the vehicle roof and away from occupants carried beneath the roof upon deployment of the curtain airbag.

BRIEF DESCRIPTION OF THE DRAWINGS

The one or more embodiments may take form in various components and arrangements of components, and in various steps and arrangements of steps. The drawings are only for purposes of illustrating the one or more embodiments and are not to be construed as limiting the invention.

FIG. 1 is a schematic partial perspective view of a vehicle having a sunroof drain tube mounted to a vehicle roof rail adjacent a side airbag.

DETAILED DESCRIPTION

Figure 1:
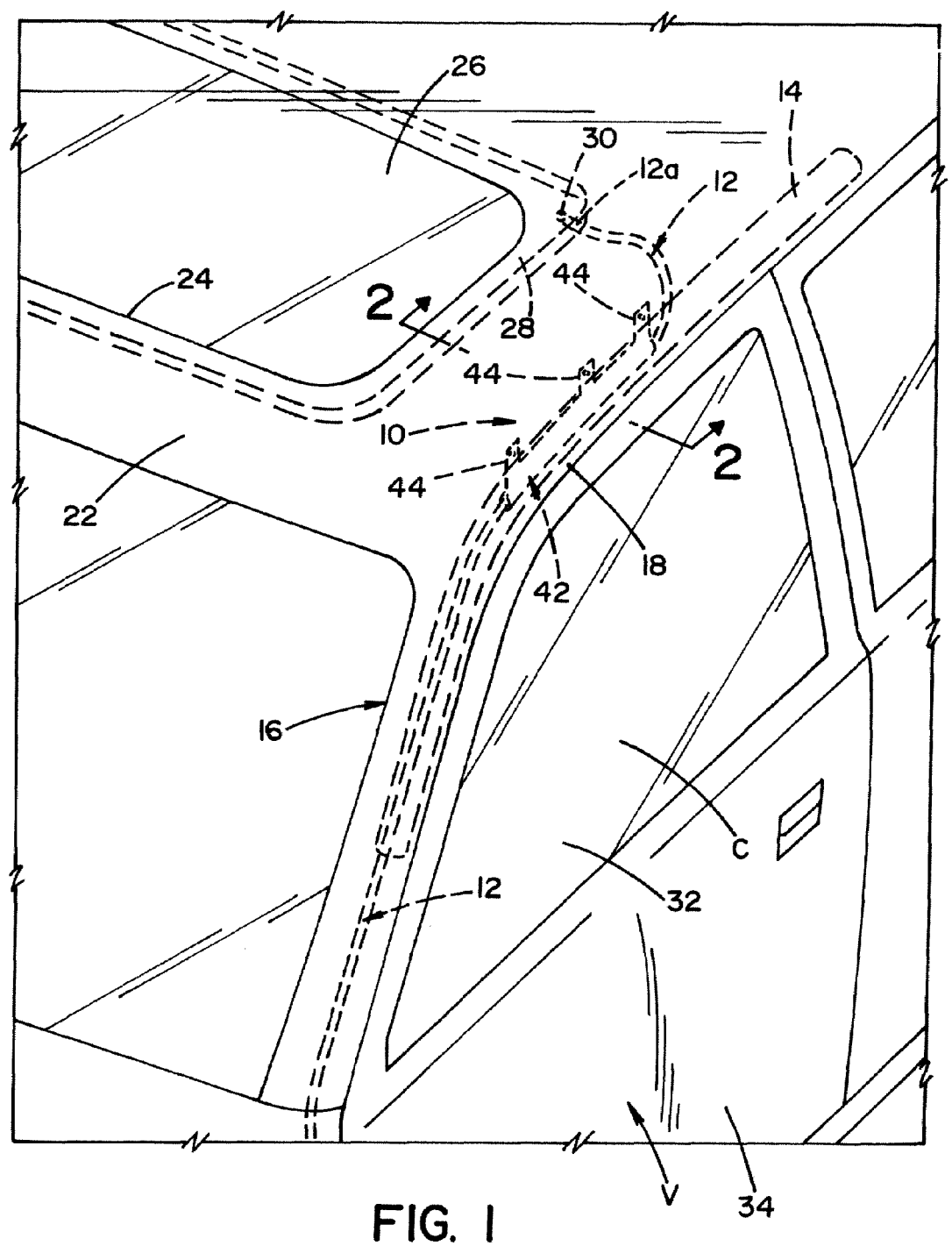
Figure 2:
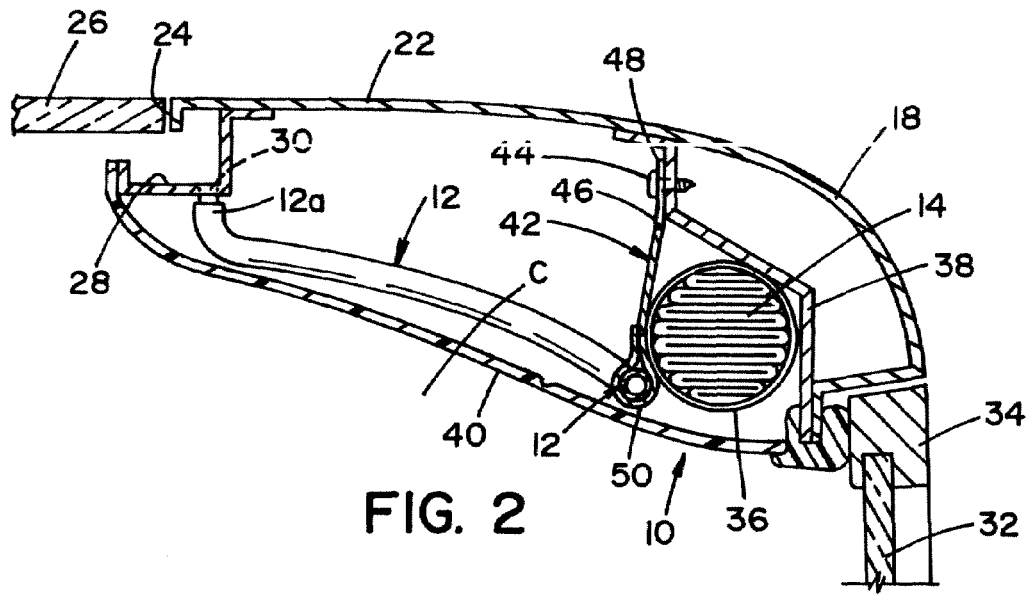
FIG. 2 is a schematic cross-sectional view of the drain tube and side airbag taken along the line 2-2 of FIG. 1.
Figure 3:
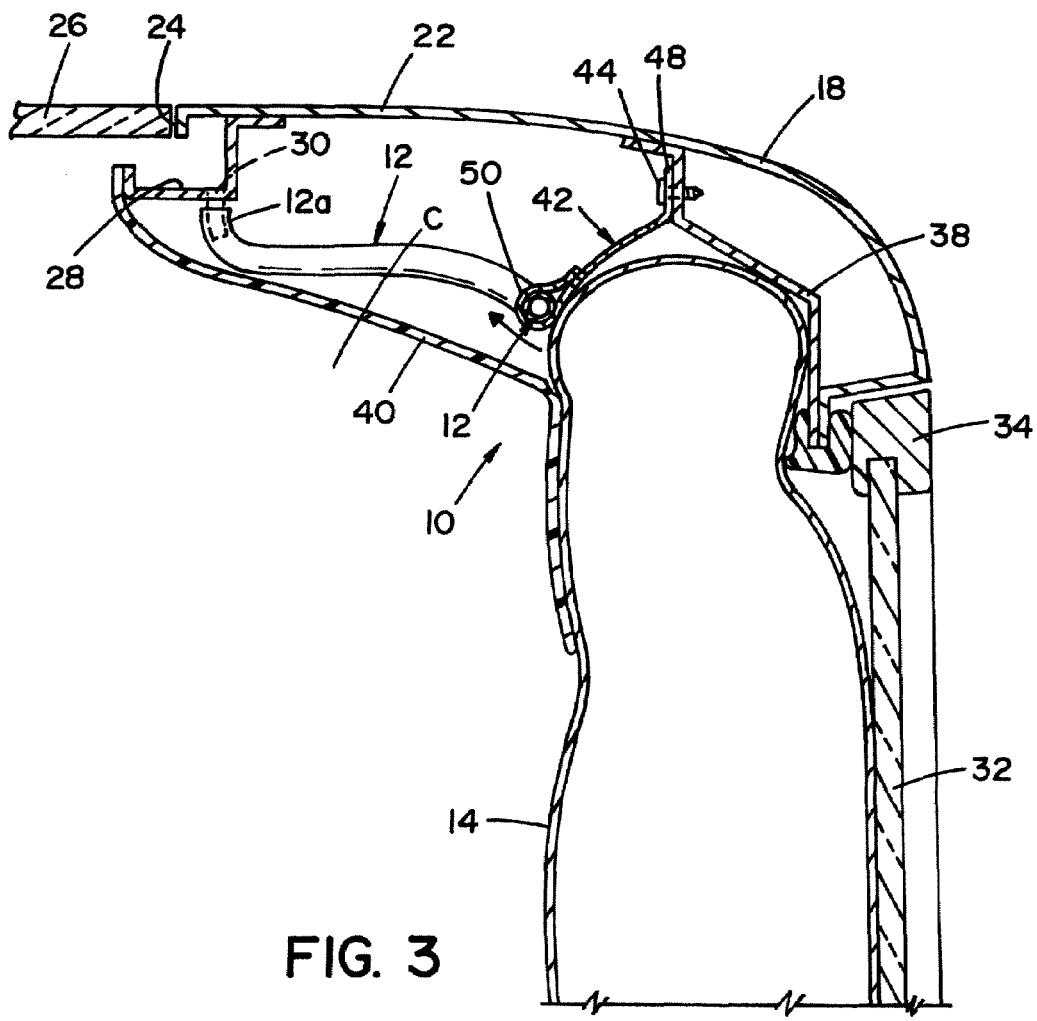
FIG. 3 is a schematic cross-sectional view of the drain tube and side airbag of FIG. 2 shown with the airbag deployed.
Figure 4:
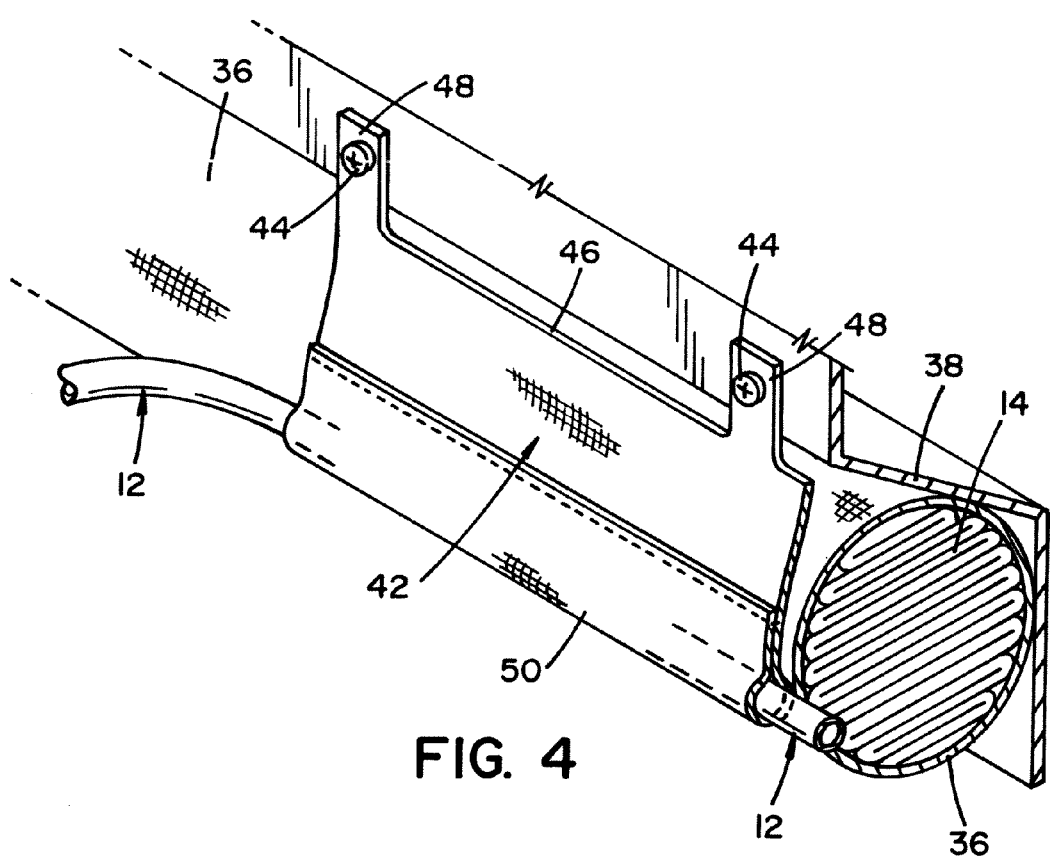
FIG. 4 is a schematic partial perspective view of the drain tube and side airbag of FIG. 1.

Referring now to the drawings wherein the showings are for purposes of illustrating one or more embodiments only and not for purposes of limiting the same, with reference to FIGS. 1-4, a vehicle mounting arrangement is shown in a vehicle V and generally designated by reference numeral 10. The mounting arrangement 10 includes an elongated conduit or drain tube 12 mounted along or adjacent an inflatable member or airbag 14. The vehicle V includes a frame 16 having a pair of opposed side roof rails (only roof rail 18 shown) supporting a vehicle roof 22 over a passenger compartment or cabin C of the vehicle V. In one embodiment, the roof 22 defines an opening 24 for a sunroof 26 or other like device and the drain tube 12 is a sunroof drain tube.

An area or gutter 28 around the opening 24 collects drainage such as rain water and prevents the drainage from passing into the passenger cabin C. As is well known, the drain tube 12 is provided for receiving the collected drainage and directing the received drainage away from the opening 24 and the area 28. In one embodiment, the drain tube 12 is fluidly connected to an aperture 30 in the gutter 28 and extends along one of the side roof rails 18 and along the inflatable airbag 14. The drain tube 12 has an inlet portion 12a for receiving water drainage from the area 28 and an outlet portion (not shown) for draining or releasing received water drainage to the environment or ambient. As will be described in more detail below, the drain tube 12 and the inflatable airbag 14 are mounted to the vehicle roof rail 18 of the vehicle V.

Generally, the inflatable airbag 14 is a side curtain airbag stored and mounted along the side roof rail 18 for selectively creating an inflatable barrier extending from the roof rail along the passenger cabin C. Alternatively, the airbag 14 could instead be a flag-type barrier that is not inflated but deployed similarly to a side curtain airbag. In one embodiment, the side curtain airbag 14 is sized to inflate and substantially cover at least a side window 32 of the vehicle V and, optionally, all or a portion of the door 34 over which the curtain airbag 14 is mounted. While the curtain airbag 14 is appropriately sized to cover a large area, the roof rail 18 is often limited in size to provide for a more spacious interior (i.e., passenger cabin C) and to accommodate the side windows, including side window 32, being larger in size.

As is known, the curtain airbag 14 is folded, rolled or otherwise minimized in size for mounting along the roof rail 18. Preferably, the curtain airbag 14 is bundled so that its dimensions are similar or smaller than those of the roof rail 18. The curtain airbag 14 is optionally held together in a housing or tubular sock 36 made of lightweight flexible semi-elastic material. The sock 36 is configured to break open longitudinally when the inflatable curtain 14 is deployed, i.e., inflated such as during a collision.

As is known to those skilled in the art, the curtain airbag 14 is operatively mounted to the side rail 18 so that the airbag 14 is maintained in a preferred position and orientation should the curtain 14 be deployed. In the illustrated embodiment, the roof rail 18 includes a portion of the frame 16 between the vehicle roof 22 and the door 34, and further includes a reinforcing member 38 connected, such as by welding, to the frame 16. It is to be appreciated by those skilled in the art that the roof rail could be constructed in a variety of configurations and is not to be limited by that shown and described herein. Due at least in part to the positioning of the airbag 14, during deployment, the curtain airbag 14 expands toward an interior side of the vehicle (i.e., away from the roof rail 18 and into the passenger cabin C) and downward from the roof rail 18 alongside the window 32 of the vehicle V and along the passenger compartment C defined thereby.

In the illustrated embodiment, the undeployed airbag 14 is mounted against or adjacent the reinforcement member 38 and the drain tube 12 is mounted against or adjacent the side airbag 14. A trim piece 40 is optionally mounted to the roof rail 18 to cover the airbag 14 and the drain tube 12. More specifically, the drain tube 12 is pivotally mounted to the roof rail 18 (and, specifically, the reinforcement member 38) and positioned adjacent the curtain airbag 14 to extend along a length of the roof rail 18. The pivotal mounting of the drain tube 12 and the positioning of the drain tube relative to the curtain airbag 14 causes the drain tube 12 to be pivotally displaced upon inflation and expansion of the curtain airbag 14 (shown in FIG. 3). More particularly, the drain tube 12 is pivotally moved upward about the vehicle roof rail 18 toward the roof 22, and away from the passenger cabin C, upon expansion of the curtain airbag 14 thereby avoiding being projected into the passenger cabin C.

In one embodiment, the mounting arrangement 10, also referred to herein as a drain tube mounting arrangement, includes a sling 42 that pivotally connects or mounts the drain tube 12 to the roof rail 18. The sling 42 is mounted to the roof rail 18 and, specifically, the reinforcing member 38 via suitable fasteners 44 to carry and hingedly support the drain tube 12 adjacent, and preferably closely adjacent, the curtain airbag 14. More specifically, the sling 42 carries the drain tube 12 so that the drain tube 12 is mounted toward the interior side of the vehicle V relative to the inflatable airbag, i.e., the drain tube 12 is mounted inwardly from the curtain airbag 14 in the direction of the passenger compartment C and along an interior side of the curtain airbag 14. The sling 42 enables the drain tube 12 to be moveable toward the roof 22 upon deployment of the curtain airbag 14 while remaining connected to the roof rail 18 after deployment of the curtain airbag.

In one embodiment, the sling is a canvas sling. As used herein, canvas is intended to include all flexible material sheets suitable for mounting the drain tube 12 as described herein. The sling 42 includes a secured end 46 having tab portions 48 that are connected to the roof rail 18 by the suitable fasteners 44, which can be screws for example, and a looped end 50 that carries the drain tube 12. As already indicated, the sling 42 pivotally mounts the drain tube 12 adjacent the curtain airbag 14. Upon deployment of the airbag 14, the sling 42 is forced pivotally about the roof rail 18 by the expansion of the airbag 14 in the direction of the sling 42. When forced to pivotally move, the sling 42 carries the drain tube 12 upward away from the passenger compartment C in which vehicle occupants may be present and directs the tube 12 toward the roof 22 of the vehicle.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A drain tube mounting arrangement in a vehicle, comprising:
    an inflatable member mounted to a vehicle roof rail and expandable away from said vehicle roof rail along a passenger compartment of said vehicle; and
    a liquid drain tube defining a fluid flow path therethrough pivotally mounted to said vehicle roof rail along said inflatable member so that upon deployment of said inflatable member said drain tube is pivotally moved to allow said inflatable member to pass thereby with said fluid flow path remaining intact so as to continue to allow drainage through said drain tube to flow along said drain tube past said inflatable member.

2. The vehicle mounting arrangement of claim 1 wherein said inflatable member is a side curtain airbag.

3. The vehicle mounting arrangement of claim 1 further including at least one mount connecting said inflatable member to said vehicle roof rail.

4. The vehicle mounting arrangement of claim 1 further including:
    a sling hingedly supporting said drain tube from said vehicle roof rail adjacent said inflatable member.

5. The vehicle mounting arrangement of claim 1 wherein said drain tube is pivotally moved upward about said vehicle roof rail upon expansion of said inflatable member so as to avoid being projected into a passenger compartment of said vehicle.

6. The vehicle mounting arrangement of claim 1 wherein said sunroof drain tube is mounted toward the interior side of the said vehicle relative to said inflatable member.

7. The vehicle mounting arrangement of claim 1 wherein said drain tube has an axially extending section pivotally mounted to said vehicle roof rail and positioned adjacent said inflatable member so that said axially extending section is pivotally displaced about an axis generally parallel to said axially extending section upon expansion of said inflatable member.

8. The vehicle mounting arrangement of claim 1 further including:
    a sling mounted to said vehicle roof rail and carrying said drain tube closely adjacent said inflatable member, said sling enabling said drain tube to move toward a roof of said vehicle upon deployment of said inflatable member.

9. The vehicle mounting arrangement of claim 1 wherein said drain tube is a sunroof drain tube having an inlet for receiving water drainage from an area around a sunroof of said vehicle and an outlet for draining said water drainage to ambient.

10. The vehicle mounting arrangement of claim 4 wherein said sling is a canvas sling having a secured end connected to said roof rail by fasteners and a looped end for carrying said drain tube.

11. The vehicle mounting arrangement of claim 10 wherein said sling is positioned between two mounts that secure said inflatable member to the roof rail.

12. A sunroof drain tube mounting arrangement, comprising:
    a curtain airbag mounted along one side of a vehicle roof; and
    a sunroof drain tube pivotally mounted along said one side of said vehicle roof adjacent an interior side of said curtain airbag so that said drain tube is pivotally directed toward said vehicle roof and away from occupants carried beneath said roof upon deployment of said curtain airbag, said sunroof drain tube defining a fluid flow path therethrough and being pivotally mounted along said one side of said vehicle roof such that said fluid flow path remains intact when said drain tube is pivotally moved upon deployment of said curtain airbag.

13. The sunroof drain tube mounting arrangement of claim 12 wherein said sunroof drain tube has an axial length portion that is pivotally mounted along said one side of said vehicle roof such that said axial length portion pivotally moves about an axis generally parallel to said axial length portion upon deployment of said curtain airbag.

14. The sunroof drain tube mounting arrangement of claim 12 wherein said drain tube and said curtain airbag are mounted to a vehicle roof rail of the roof and said drain tube is pivotally moved upward about said vehicle roof rail upon expansion of said curtain airbag so as to avoid being projected into a passenger compartment of said vehicle.

15. The sunroof drain tube mounting arrangement of claim 14 further including:
    a sling pivotally connecting said sunroof drain tube to the vehicle roof rail.

16. The sunroof drain tube mounting arrangement of claim 14 further including:
    a canvas sling mounted to the vehicle roof rail and carrying said drain tube adjacent said curtain airbag.

17. The sunroof drain tube mounting arrangement of claim 12 wherein said sunroof drain tube has an inlet for receiving water drainage from an area around a sunroof of said vehicle and an outlet for draining said water drainage to ambient.

18. A method for mounting a sunroof drain tube in a vehicle having a sunroof, comprising:
    pivotally mounting a sunroof drain tube to a vehicle roof rail of the vehicle, said sunroof drain tube defining a fluid flow path therethrough;
    positioning said sunroof drain tube adjacent an inflatable airbag on a side thereof so that said sunroof drain tube is pivotally displaced upon expansion of said inflatable airbag toward an interior side of the vehicle; and
    deploying said airbag and pivotally moving said sunroof drain tube by said airbag being deployed with said fluid flow path remaining intact so as to continue to allow drainage through said drain tube to flow alone said drain tube past said inflatable airbag.

19. The method of claim 18 wherein pivotally mounting said sunroof drain tube includes supporting said drain tube in a sling hingedly mounted to said roof rail adjacent said inflatable airbag.

* * * * *

UNITED STATES PATENT AND TRADEMARK OFFICE
CERTIFICATE OF CORRECTION

PATENT NO. : 7,568,757 B2  Page 1 of 1
APPLICATION NO. : 11/935248
DATED : August 4, 2009
INVENTOR(S) : Joel Romig It is certified that error appears in the above-identified patent and that said Letters Patent is hereby corrected as shown below:

In claim 18, at Column 6, line 51, replace "alone" with --along--.

Signed and Sealed this

Twenty-ninth Day of September, 2009

David J. Kappos
*Director of the United States Patent and Trademark Office*